Sept. 22, 1942.    W. P. COX    2,296,769
CAR TRUCK
Filed May 31, 1941    2 Sheets-Sheet 1
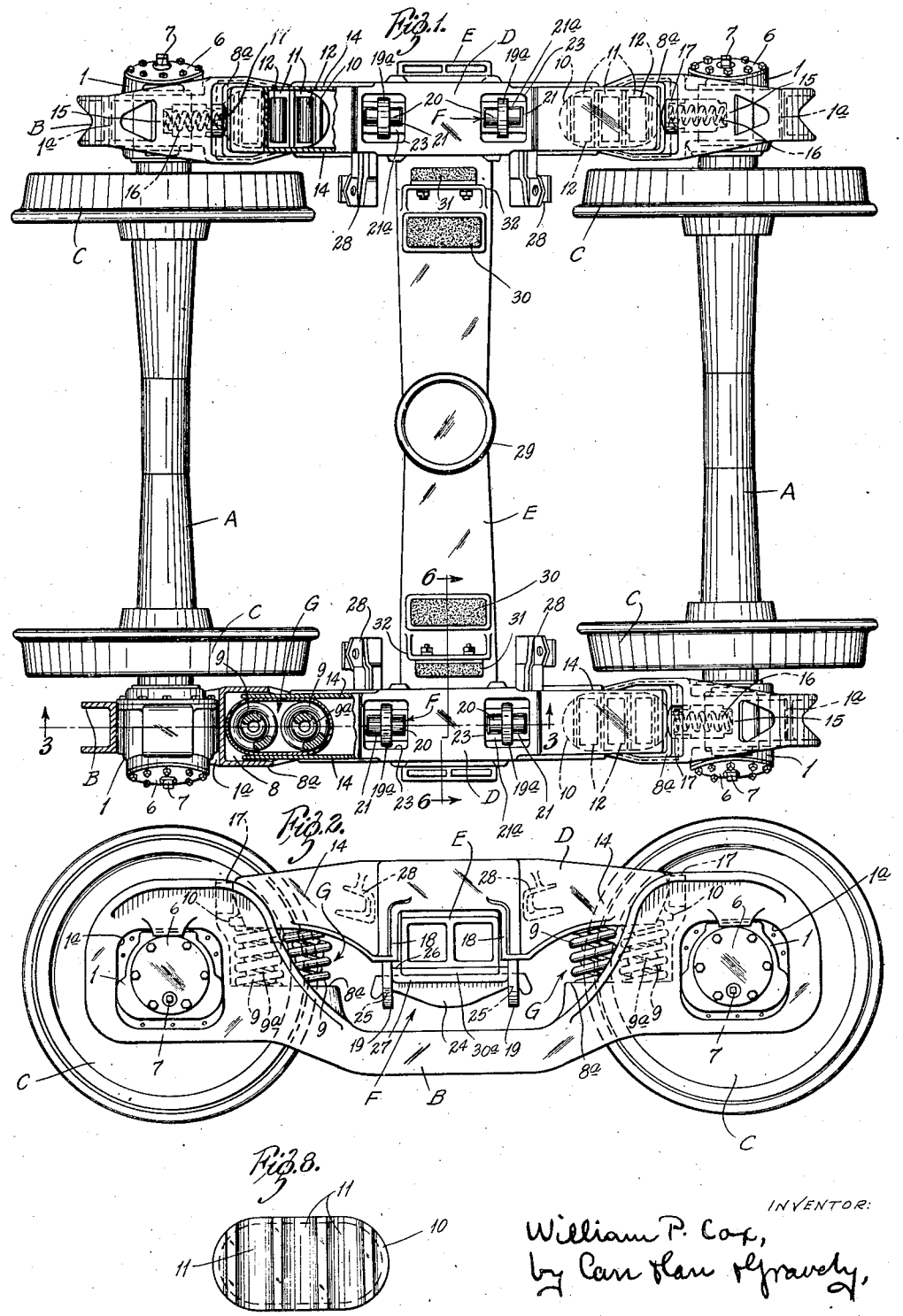
INVENTOR:
William P. Cox,
by Carr Stan Gravely,
HIS ATTORNEYS.

Sept. 22, 1942.                W. P. COX                2,296,769
                               CAR TRUCK
                          Filed May 31, 1941           2 Sheets-Sheet 2
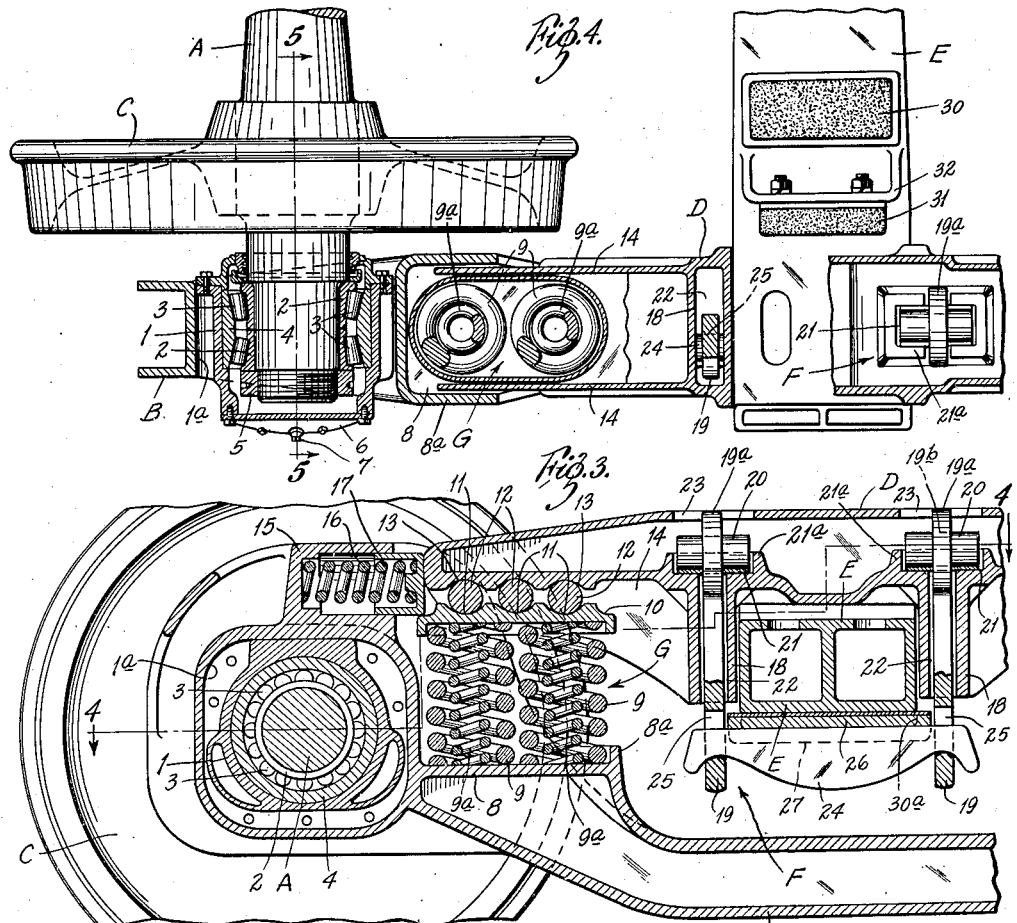
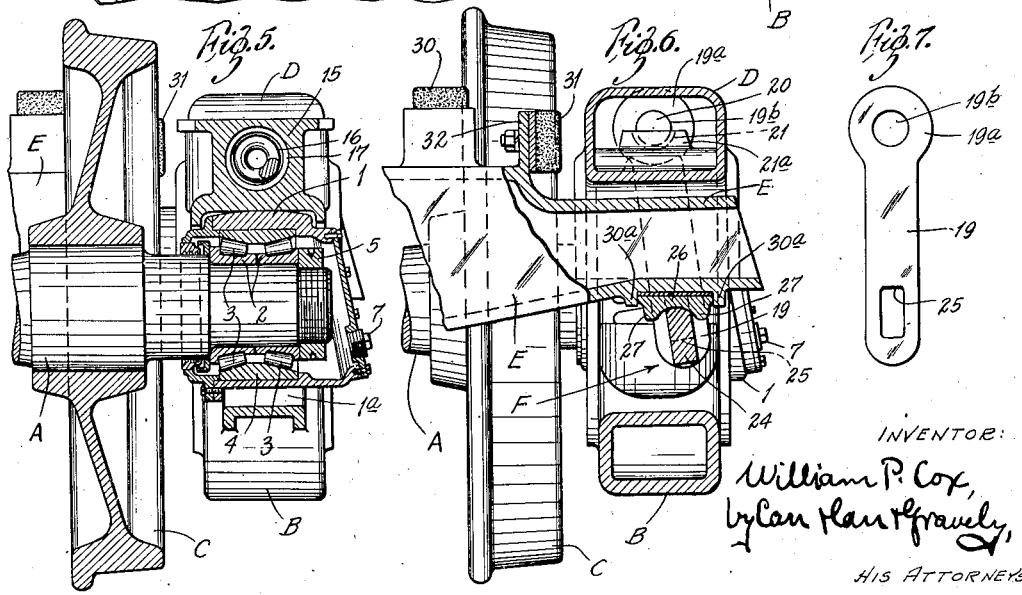

Patented Sept. 22, 1942

2,296,769

UNITED STATES PATENT OFFICE 2,296,769

CAR TRUCK

William P. Cox, Canton, Ohio, assignor to The Timken Roller Bearing Company, Canton, Ohio, a corporation of Ohio Application May 31, 1941, Serial No. 395,923

10 Claims. (Cl. 105—190)

My invention relates to railway trucks and more particularly to trucks of the swing or lateral motion type in which the bolster is supported by swing hangers.

Unsquaring of a railway car truck occurs when the wheels on one side of the truck move ahead of the wheels on the other side. One of the causes of this unsquaring is due to low spots in the road bed which frequently results in the longitudinal truck center line being displaced laterally so that the wheels on one side of the truck will run on their large cone diameters and the wheels on the other side will run on the small cone diameters; thus the wheels running on the larger cone diameters will run ahead of the wheels on the other side running on their smaller cone diameters. The wheels on the side running ahead will continue to do so until the flange pressure on the wheels running ahead reverses this condition allowing the wheels on the other side to run ahead. When a train is traveling at high speeds, the unsquaring forces acting upon the truck are quite pronounced and the reversals of action when unsquaring occurs are quite rapid. If there is a failure to control and limit the unsquaring action, the force of the reversals might become sufficient to cause derailment of the truck. However, even if the unsquaring forces do not approach the derailment point, they cause bad shocks to the car body. Present day truck designs have no devices to resist movement of the wheels on one side of a truck ahead of the wheels on the other or cushioning devices to absorb the forces set up when unsquaring occurs.

My invention has for its principal objects to devise a railway truck which will yieldingly resist and cushion unsquaring forces acting on the truck; which will guide the wheels and allow them to follow the rails; which will tend to prevent the truck from wobbling in a horizontal plane; which will have increased load carrying capacity and greater flexibility; which will be self-centering and will distribute the load equally on the axles; which will minimize the amount of unsprung weight; which will cushion and yieldingly resist shocks and dampen vibrations; which will avoid frame distortions, reduce bolster wear and eliminate the impinging of lugs on the side frames; and which will increase wheel life and eliminate the necessity of sharp flanges thereon.

The invention consists principally in the car truck and in the construction, combinations and arrangements of parts hereinafter described and claimed.

In the accompanying drawings which form part of this specification and wherein like reference symbols refer to like parts wherever they occur, Fig. 1 is a part plan and part horizontal sectional view of a car truck embodying my invention, Fig. 2 is a side elevational view of said truck, Fig. 3 is an enlarged sectional view taken on the line 3—3 in Fig. 1, Fig. 4 is a sectional view taken on the line 4—4 in Fig. 3, Fig. 5 is a sectional view taken on the line 5—5 in Fig. 4, Fig. 6 is an enlarged sectional view taken on the line 6—6 in Fig. 1, Fig. 7 is a side elevational view of one of the hanger links; and Fig. 8 is a top plan view of one of the spring caps.

In the drawings, the car truck comprises generally a pair of axles A connected at their ends by a pair of underslung side frames B, wheels C mounted on said axles adjacent to the inner sides of the side frames, upper equalizer members D extending longitudinally of said side frames, and a suitable bolster E rockably supported in hangers F mounted in said equalizer members, the ends of said equalizers being yieldably supported and positioned by said side frames, and the ends of said equalizers being yieldably cushioned against longitudinal movement thereof.

The underslung side frame members B connect journal boxes I which extend through openings Ia in said side frames B. Said journal boxes enclose the journals of their respective axles and may be of any suitable construction. In the construction shown, roller bearings are mounted on the axle journal and comprise two single inner raceway members or cones 2, two series of tapered rollers 3 and a double outer raceway member or cup 4. A threaded nut 5 is screwed on the threaded end portion of the axle to secure the parts in position. A suitable journal box lid 6 is provided having a threaded plug 7 screwed in a threaded opening at the lower end thereof.

Each side frame member B has flat seats 8 with upstanding flanges 8a around the edges thereof adjacent to the journal boxes, each seat being adapted to receive and support a two unit nest of springs, generally indicated by G. Each unit of springs preferably comprises an outer vertically disposed helical coil spring 9 and an inner reversely wound vertically disposed helical coil spring 9a. These two unit nests of vertically disposed springs are retained by the upwardly extending flanges 8a which extend around the edges of the seats and upwardly along the sides of the side frame high enough to enclose and form guides or positioning pockets for the ends of the equalizer. The upper end of each nest of springs is enclosed by a cap 10. The top of said cap is provided with three concave grooves 11 extending in a transverse direction to said side frame. These grooves are adapted to receive self-centering rollers 12 and the lower surface of the equalizer member D is provided with three corresponding transverse concave grooves 13. Flanges 14 depending from said equalizer enclose said rollers and said spring cap.

Integral with the side frames B and above each journal box 1 is a spring housing 15 having a chamber therein which is longitudinally alined with said equalizer member and has an opening adjacent to the end of the equalizer member. A horizontally disposed helical coil spring 16 is mounted in said housing and the end portion thereof extends through said opening. A spring cap 17 is provided for the free end of said spring and fits over the exposed end of the spring, said cap extending within said housing and being adapted to slide along inner sides of the walls thereof.

Each of the equalizer members is preferably hollow and has downwardly extending arms 18 adjacent to the central portion thereof defining a recess into which one of the ends of the bolster extends. The end of the bolster is supported in said recess by the rockable hanger F which comprises vertical hanger links 19 having rounded enlarged heads 19a with circular openings 19b therethrough. Rollers 20 extend through said circular openings and are adapted to seat in concave seats 21 provided therefor adjacent to the top of said equalizer member. Said seats have an upstanding flange 21a extending therearound to retain the rollers in the seats. The links extend through openings 22 in the equalizer and the lower portions of said links are slotted and depend below the bottom of said equalizer arms 18. Openings 23 are provided in the top of the hollow equalizer whereby said vertical hanger links 19 may be installed. Said vertical links 19 are adapted to rock on said rollers 20 in said seats 21 when the bolster moves laterally. A cross link 24 connects the two vertical links 19 and the ends thereof extend through the slots 25 in said vertical hanger links. Said cross link is retained in position by constricted portions near the ends thereof which are positioned in the slots of the vertical links. The end of the bolster is mounted on a plate 26. Said plate is interposed between the cross link and the bolster and has depending flanges 27 extending transversely across the bottom thereof for engaging the sides of said cross link to keep said plate from becoming displaced. The bolster E has depending ribs 30a which engage the sides of plate 26 to maintain said bolster in place.

The equalizer members D are provided with suitable brake hanger brackets 28 extending inwardly therefrom.

The bolster E is of any suitable construction and is shown having an upstanding center plate ring 29 formed integral therewith and it is also provided with suitable side bearings 30. Rubber pad bumpers 31 are secured to upstanding projections 32 adjacent to said bearings to cushion and limit the lateral movement of the bolster.

My improved truck has many advantages. The horizontally disposed springs adjacent to the ends of the equalizer members and the rollers in the grooves cushion and resist longitudinal movement of the equalizer members. Thus, unsquaring forces acting upon the truck are yieldingly resisted. The equalizers are self-centering as the springs 16 and rollers in the grooves will tend to return the equalizers to their normal position. Plunging forces caused by the train speeding up or slowing down will be resisted or absorbed. Also, my truck permits the bolster to float in two directions but prevents it from wobbling in a horizontal plane. Also, with my truck there will be less bolster wear, less wear on the wheels and there are no lugs to impinge on the side frames. Furthermore, the vertical springs cushion the bounce caused by the wheels dropping into low spots on the rails.

Obviously, numerous modifications of my construction may be made and I do not wish to be limited to the precise construction shown.

What I claim is:

1. A car truck comprising a side frame, wheeled axles, a bolster, said side frame having a lower underslung axle connecting section and an upper longitudinally movable bolster supporting section yieldably supported on said lower section, supports interposed between the ends of said upper section and said lower section, the tops of said supports having concave grooves therein extending transversely of said upper section, rollers in said grooves, the bottoms of the ends of said upper section having concave grooves corresponding to said concave grooves in said supports, said rollers in said grooves being adapted to resist longitudinal movement of said upper section.

2. A car truck comprising side frames, wheeled axles, a bolster, each of said side frames comprising an underslung section connecting said axles, and having above the respective axles horizontal chambers opening towards each other and constituting spring housings, and an equalizer yieldably supported at its ends on the underslung section and supporting a rockable hanger, said hanger supporting an end of said bolster, and horizontally acting coil springs mounted in said chambers and bearing longitudinally against the ends of said equalizer for yieldably resisting longitudinal movement of said equalizer.

3. A car truck comprising wheeled axles, side frames connecting said axles, a bolster, longitudinally movable equalizers yieldably supported on said side frames and having recesses therethrough adapted to receive the ends of said bolster, rockable hangers for supporting the ends of said bolster, said hangers rockably mounted in the upper portions of said equalizers and extending beneath said recesses, horizontally disposed springs mounted on said side frames and bearing longitudinally against the ends of said equalizers.

4. A car truck comprising wheeled axles, side frames connecting said axles and arranged for limited endwise movement relative to each other, a bolster, longitudinally movable equalizers supported on said side frames and having depending arms forming recesses adapted to receive the ends of said bolster, transversely rockable hangers for supporting the ends of said bolster, said hangers rockably mounted in the upper portions of said equalizers and extending beneath said recesses, vertically disposed springs interposed between the ends of said equalizers and said side frames, horizontally disposed springs mounted on the side frames and extending longitudinally of said equalizers and bearing against the ends thereof to yieldingly resist longitudinal movement of said equalizers.

5. A car truck comprising wheeled axles, a side frame connecting said axles, a longitudinally movable equalizer member having a recess in the lower central portion thereof, a bolster having an end extending into said recess, a swing hanger rockably supported in the upper portion of said equalizer member and supporting the end of said bolster in said recess, spring seats adjacent to said axles on said side frame, vertically disposed springs supported on said spring seats, caps for the tops of said springs having concave grooves extending transversely of said side frame, rollers for said grooves, concave grooves in said equalizer member corresponding to said concave grooves, said equalizer member supported on said rollers, housings above said axles having chambers therein opening adjacent to the ends of said equalizer member, horizontally disposed springs in said chambers, caps for said springs, said springs and said rollers being adapted to resist longitudinal movement of said equalizer member.

6. A car truck comprising side frames capable of limited endwise movement with relation to each other, wheeled axles, a bolster, each of said side frames comprising a lower section connecting said axles and an upper section yieldably supported on said axle connecting section for vertical movement relative thereto, swing hangers rockably mounted in said upper section for transverse movement and the ends of said bolster being supported by said hangers and means for yieldably opposing longitudinal movement of said upper section, said means comprising horizontally acting springs mounted on said lower section in operative engagement with the ends of said upper section.

7. A car truck comprising wheeled axles, side frames connecting said axles, longitudinally movable equalizers each having a recess in the lower central portion thereof, a bolster whose ends extend into the recesses of the respective equalizers, a hanger rockably supported in the upper portion of each equalizer and supporting the end of said bolster, vertically disposed springs interposed between each side frame and the ends of said equalizer for yieldably supporting said bolster, caps for the tops of said springs with grooves in the top thereof extending transversely of said side frame, rollers in said grooves, the bottom of the ends of said equalizer having grooves corresponding to said cap grooves and cooperating with said rollers whereby said equalizer is self-centering, and horizontally disposed springs mounted on the side frames in cooperative relation with the ends of said equalizer to resist longitudinal movement of said equalizer.

8. A car truck construction comprising wheeled axles, side frames with integral journal boxes for said axles and with spring seats close to said journal boxes, springs supported on said seats, equalizer members supported on said springs, hangers pivotally suspended from said equalizer members for movement transversely thereof, and a bolster with its ends supported by said hangers, the side frames having inwardly opening pockets in which the ends of the equalizer members are movably positioned and springs in said pockets for yieldably opposing endwise movement of said members.

9. A car truck construction comprising side frames with integral journal boxes and with spring seats close to said journal boxes, wheeled axles journaled in said boxes, springs supported on said seats, equalizer members supported on said springs, hangers pivotally suspended from said equalizer members for movement transversely thereof, and a bolster with its ends supported by said hangers, the side frames having inwardly opening pockets in which the ends of the equalizer members are movably positioned and springs in said pockets for yieldably opposing endwise movement of said members.

10. A car truck construction comprising side frames with integral journal boxes and with spring seats between said journal boxes and close to them respectively and with a pocket at the upper part of each journal box for housing a spring and guiding the adjacent end of an equalizer, wheeled axles journaled in said boxes, vertically disposed springs supported on said seats and horizontally disposed springs in said pockets, equalizers supported on said vertical springs with their ends in operative engagement with said horizontal springs, hangers pivotally suspended from said equalizers for swinging movement transversely thereof, and a bolster with its ends supported by said hangers in downwardly opening recesses in the bottoms of said equalizers.

WILLIAM P. COX.